United States Patent
Szor et al.

(10) Patent No.: US 7,540,026 B1
(45) Date of Patent: May 26, 2009

(54) NO-EXECUTE PROCESSOR FEATURE GLOBAL DISABLING PREVENTION SYSTEM AND METHOD

(75) Inventors: Peter Szor, Northridge, CA (US); Peter Ferrie, Los Angeles, CA (US)

(73) Assignee: Symantec Corporation, Cupertino, CA (US)

( * ) Notice: Subject to any disclaimer, the term of this patent is extended or adjusted under 35 U.S.C. 154(b) by 879 days.

(21) Appl. No.: 11/042,418

(22) Filed: Jan. 24, 2005

(51) Int. Cl.
*G06F 12/14* (2006.01)

(52) U.S. Cl. ............................. 726/22; 726/25; 714/48; 714/51; 714/47; 712/220; 711/163

(58) Field of Classification Search .................... 726/22
See application file for complete search history.

(56) References Cited

U.S. PATENT DOCUMENTS 5,317,717 A * 5/1994 Cutler et al. ................. 711/163
5,724,536 A * 3/1998 Abramson et al. ........... 712/216

OTHER PUBLICATIONS

Grevstad, E., 'CPU-Based Security: The NX Bit', earthweb.com, May 24, 2004, entire document, http://hardware.earthweb.com/chips/print.php/3358421.*

Shinagawa, T., 'SegmentShield: Exploiting Segmentation Hardware for Protecting against Buffer Overflow Attacks', 2006, 25th IEEE Symposium on Reliable Distributed Systems (SRDS'06), entire document, http://ieeexplore.ieee.org/stamp/stamp.jsp?arnumber=04032489.*

Shihjong Kuo, *"Execute Disable Bit Functionality Blocks Malware Code Execution"*, pp. 1-14, Retrieved on Jan. 11, 2005. Retrieved from the Internet:<URL:http://ww.intel.com/cd/ids/developer/asmo-na/eng/149308.htm>.

* cited by examiner

*Primary Examiner*—Kambiz Zand
*Assistant Examiner*—Ronald Baum
(74) *Attorney, Agent, or Firm*—Gunnison, McKay & Hodgson, L.L.P.; Serge J. Hodgson

(57) ABSTRACT

A method includes stalling execution of a model specific register write function to write to a model specific register of a processor having a no-execute processor feature enabled, determining that the model specific register is a no-execute model specific register of the processor, and determining whether a no-execute field in the no-execute model specific register is being altered. Upon a determination that the no-execute field is being altered, the method further includes taking protective action to prevent disabling of the no-execute processor feature.

21 Claims, 2 Drawing Sheets

NO-EXECUTE PROCESSOR FEATURE GLOBAL DISABLING PREVENTION SYSTEM AND METHOD

BACKGROUND OF THE INVENTION

1. Field of the Invention

The present invention relates to the protection of computer systems. More particularly, the present invention relates to a system and method of preventing buffer overflow exploitation.

2. Description of the Related Art

Buffer overflow techniques have been used by malicious hackers and virus writers to attack computer systems. Buffers are data storage areas, which generally hold a predefined amount of finite data. A buffer overflow occurs when a program attempts to store data into the buffer, where the data is larger than the size of the buffer.

When the data exceeds the size of the buffer, the extra data can overflow into the adjacent memory locations. In this manner, it is possible to corrupt valid data and possibly to change the execution flow and instructions. Thus, by exploiting a buffer overflow, it is possible to inject malicious code, sometimes called shell code, into the execution flow. This shell code allows remote system level access, giving unauthorized access to not only malicious hackers, but also to replicating malware, e.g., worms.

Recently, manufactures have added a no-execute processor feature to processors such as to an IA-32 processor with no-execute bit capability. When enabled, the no-execute processor feature prevents execution from non-executable pages of memory such as the buffer. In this manner, execution of shell code located within a buffer is prevented thus defeating buffer overflow attacks.

SUMMARY OF THE INVENTION

In accordance with one embodiment of the present invention, a method includes stalling execution of a model specific register write function to write to a model specific register of a processor having a no-execute processor feature enabled, determining that the model specific register is a no-execute model specific register of the processor, and determining whether a no-execute field in the no-execute model specific register is being altered. The no-execute model specific register includes within the no-execute field a no-execute bit, which defines whether the no-execute processor feature of the processor is enabled or disabled. Upon a determination that the no-execute field is being altered, e.g., the no-execute bit is being changed from a one (1) to a zero (0), the method further includes taking protective action to prevent the no-execute processor feature from being disabled.

Thus, when the no-execute field is being altered, invocation of the model specific register write function is highly likely, if not certainly, associated with malicious code attempting to defeat the no-execute processor feature of the processor. Accordingly, protective action is taken to prevent disabling of the no-execute processor feature.

Embodiments in accordance with the present invention are best understood by reference to the following detailed description when read in conjunction with the accompanying drawings.

BRIEF DESCRIPTION OF THE DRAWING

Common reference numerals are used throughout the drawings and detailed description to indicate like elements.

DETAILED DESCRIPTION

Figure 2:
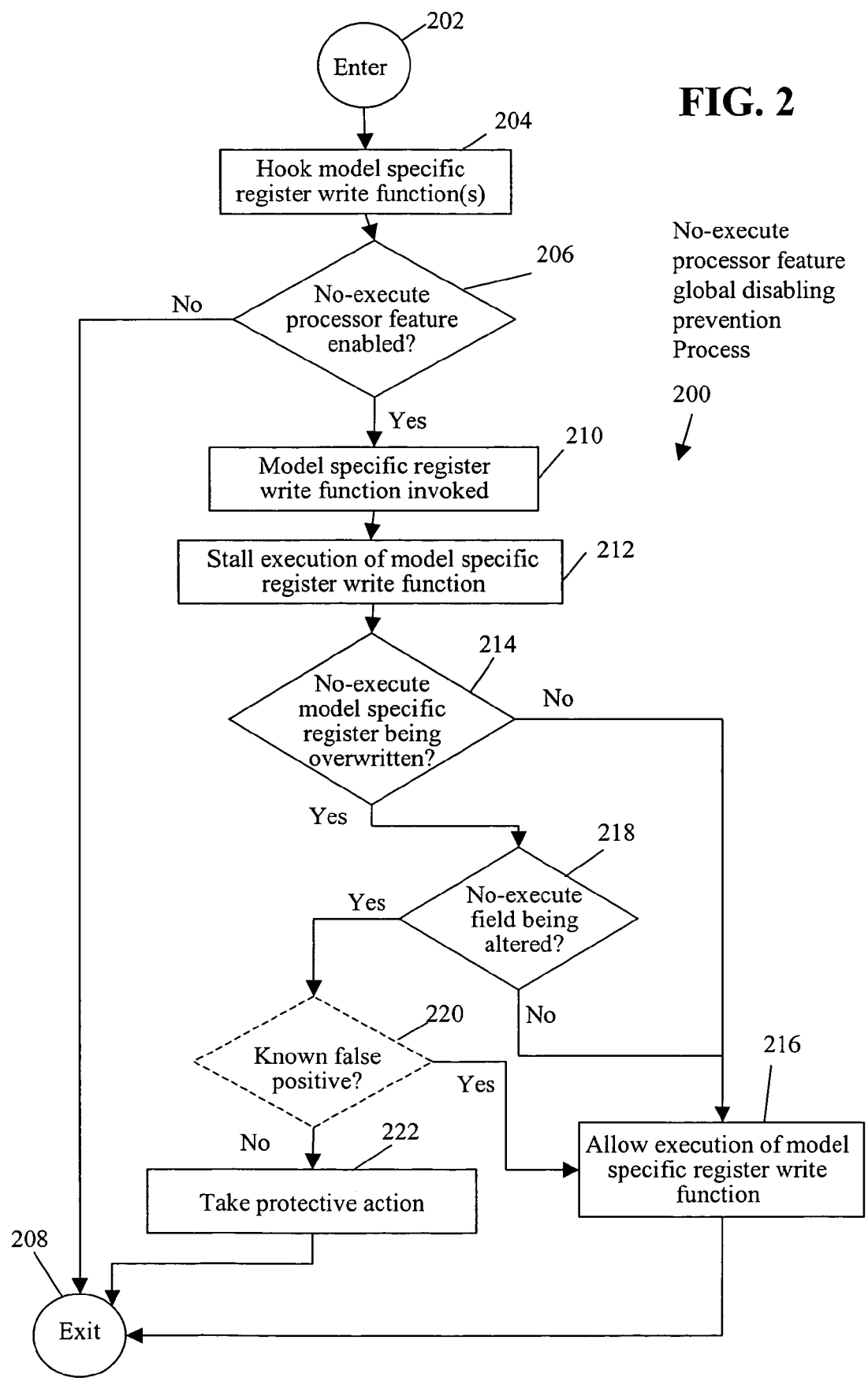
FIG. 2 is a flow diagram of a no-execute processor feature global disabling prevention process in accordance with one embodiment of the present invention.

In accordance with one embodiment, referring to FIG. 2, a method includes stalling execution of a model specific register write function to write to a model specific register of a processor having a no-execute processor feature enabled in a STALL EXECUTION OF MODEL SPECIFIC REGISTER WRITE FUNCTION OPERATION 212, determining that the model specific register is a no-execute model specific register of the processor in a NO-EXECUTE MODEL SPECIFIC REGISTER BEING OVERWRITTEN CHECK OPERATION 214, and determining whether a no-execute field in the no-execute model specific register is being altered in a NO-EXECUTE FIELD BEING ALTERED CHECK OPERATION 218. Upon a determination that the no-execute field is being altered, the method further includes taking protective action to protect a computer system having the processor in a TAKE PROTECTIVE ACTION OPERATION 222.

Thus, when the no-execute field is being altered, invocation of the model specific register write function is highly likely, if not certainly, associated with malicious code attempting to defeat the no-execute processor feature of the processor. Accordingly, protective action is taken to prevent disabling of the no-execute processor feature.

Figure 1:
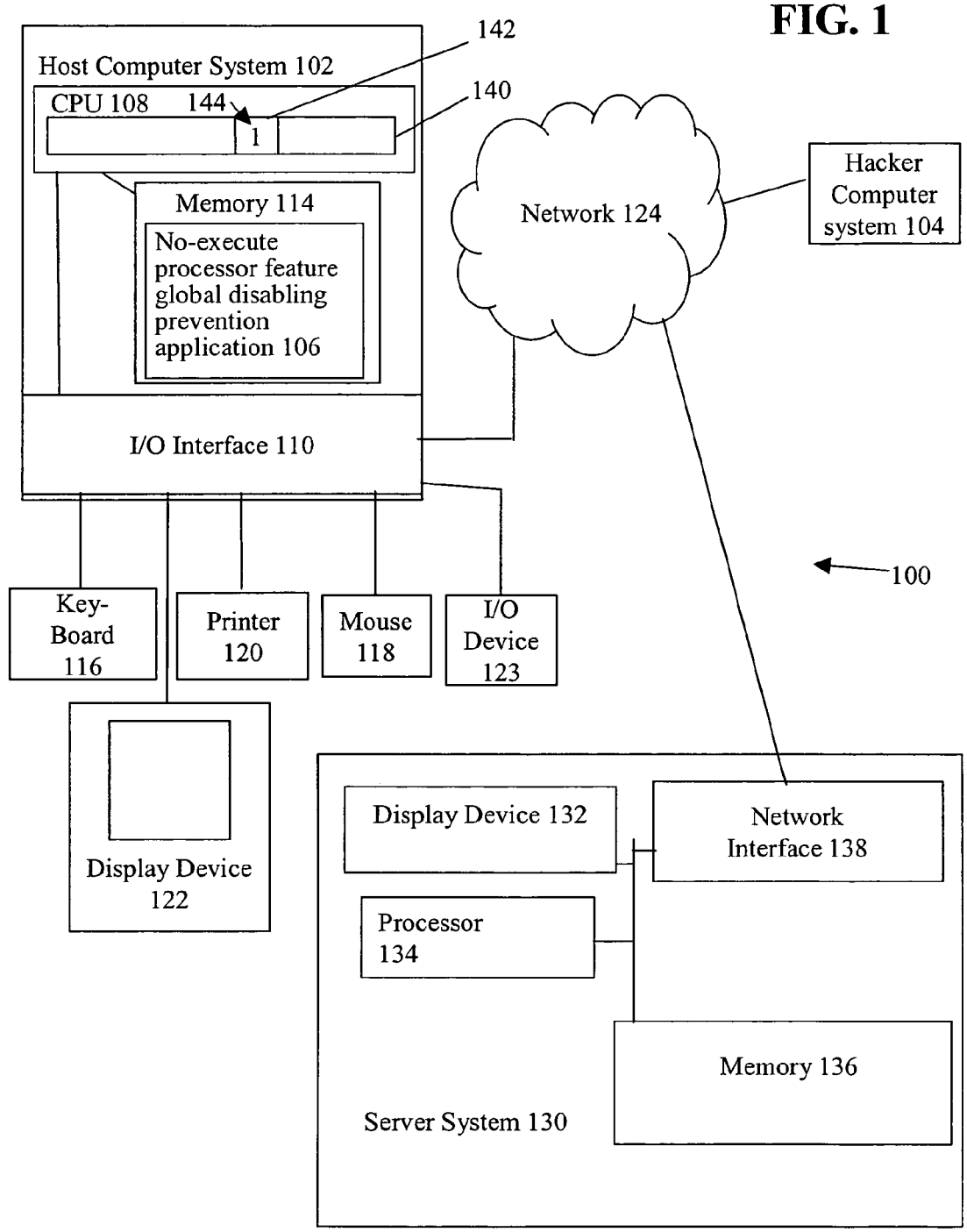
FIG. 1 is a diagram of a client-server system that includes a no-execute processor feature global disabling prevention application executing on a host computer system in accordance with one embodiment of the present invention.

More particularly, FIG. 1 is a diagram of a client-server system 100 that includes a no-execute processor feature global disabling prevention application 106 executing on a host computer system 102, e.g., a first computer system, in accordance with one embodiment of the present invention.

Host computer system 102, sometimes called a client or user device, typically includes a central processing unit (CPU) 108, hereinafter processor 108, an input output (I/O) interface 110, and a memory 114. Host computer system 102 may further include standard devices like a keyboard 116, a mouse 118, a printer 120, and a display device 122, as well as, one or more standard input/output (I/O) devices 123, such as a compact disk (CD) or DVD drive, floppy disk drive, or other digital or waveform port for inputting data to and outputting data from host computer system 102. In one embodiment, no-execute processor feature global disabling prevention application 106 is loaded into host computer system 102 via I/O device 123, such as from a CD, DVD or floppy disk containing no-execute processor feature global disabling prevention application 106.

In one embodiment, memory 114 includes a page based virtual memory system that uses pages, e.g., 4096 byte memory areas. These pages have individual properties such as, for example, that they are non-executable and/or executable. A page is non-executable if it is marked as writable, i.e., is marked as a page for storage of data. A page is executable if it is marked as executable, i.e., is marked as a page for storing executable content. In one embodiment, a set of flags describe the properties of a page. For example, these flags are maintained in the pages tables or in other operating system managed lists or databases. Virtual memory systems are well known to those of skill in the art and so are only discussed briefly to avoid detracting from the principles of the invention.

Processor 108 includes a plurality of model specific registers including a no-execute model specific register 140, e.g., the IA32_EFER MSR at address C0000080H. A register is a high speed storage area within a processor and a model specific register is a register that is specific to the particular processor, where each processor has a model number.

No-execute model specific register 140 includes a no-execute field 142, i.e., a region of no-execute model specific register 140. Illustratively, no-execute field 142 of no-execute model specific register 140 is bit 11 of the IA32_EFER MSR. No-execute field 142 contains a no-execute bit 144 sometimes called a NXE bit, i.e., a no-execute value. Although no-execute bit 144 is shown as a 1 in FIG. 1, no-execute bit 144 can be either a zero (0) or a one (1). Generally, no-execute model specific register 140 includes within no-execute field 142 a no-execute bit 144, which defines whether the no-execute processor feature of processor 108 is enabled or disabled.

In one embodiment, if no-execute bit 144 is a one (1), e.g., bit 11 of the IA32_EFER is set to 1, then a no-execute processor feature of processor 108 is enabled. Illustratively, if IA32_EFER.NXE=1, then the no-execute processor feature of processor 108 is enabled.

When enabled, the no-execute processor feature of processor 108 prevents execution of code from non-executable pages such as the buffer including the stack and heap unless the page is explicitly marked as executable. In this manner, execution of shell code located within a buffer is prevented thus defeating buffer overflow attacks.

Conversely, if no-execute bit 144 is a zero (0) or reserved, e.g., bit 11 of the IA32_EFER is set to 0, then the no-execute processor feature of processor 108 is disabled. When disabled, the no-execute processor feature of processor 108 does not prevent execution of code from non-executable pages such as the buffer. No-execute processor features are well known to those of skill in the art and so are only briefly discussed to avoid detracting from the principles of the invention. For example, see the article entitled "Execute Disable Bit Functionality Blocks Malware Code Execution" by Shihjong Kuo, available from the internet at <http://www.intel.com/cd/ids/developer/asmo-na/eng/149308.htm>, herein incorporated by reference in its entirety.

In one embodiment, processor 108 is a processor with a NX (no-execute) processor feature available in Windows XP SP2. However, processor 108 is generally any processor that supports the NX (no-execute) processor feature or data execution protection (DEP) feature. Examples of suitable processors include the Intel Pentium 4 and processors with 64-bit extensions such as EM64T as well as AMD64.

Model specific registers of processor 108 including no-execute model specific register 140 are written to using a model specific register write function, e.g., a kernel mode function, sometimes called an application program interface (API). Illustratively, the wrmsr function is used to write to model specific registers of processor 108. Generally, parameters associated with the model specific register write function define which particular model specific register is to be written to and the register value, i.e., series of bits, to be written to the particular model specific register.

In one example, the parameters associated with the model specific register write function are located on the stack. Utilizing a buffer overflow, malicious code is injected into the buffer and overwrites the parameters associate with the model specific register write function. In one embodiment, malicious code is defined as any computer program, module, set of modules, or code that enters a computer system without an authorized user's knowledge and/or without an authorized user's consent.

Specifically, the parameter that specifies the particular model specific register to be written to by the model specific register write function is overwritten with the address of no-execute model specific register 140. A return address in the buffer is overwritten with the address of the model specific register write function such that execution flow is directed to the model specific register write function.

Execution of the model specific register write function thus causes writing to no-execute model specific register 140. The register value written to no-execute model specific register 140 is also manipulated, e.g., also using the buffer overflow, by exception exploitation or otherwise, to overwrite no-execute field 142 with a zero. Overwriting no-execute field 142 with a zero disables the no-execute processor feature of processor 108. Once disabled, the malicious code in the buffer, i.e., in a non-executable memory area, is executed thus compromising host computer system 102.

Illustratively, the following sequence of bytes are available for an attacker in the current windows XP SP2 release:

InternalWindowsXPAPI:

; set parameters according to the choice of "attacker"
   mov ecx, [esp+arg_0]
   mov eax, [esp+arg_4]
   mov edx, [esp+arg_8]
   wrmsr
   retn 0Ch Note that the attacker can return to the wrmsr function, sometimes called instruction, directly, if the attacker can find a way to set the registers correctly. Thus, the attacker does not need to hit an API entry point with a return-to-LIBC attack (InternalWindowsXPAPI in the example).

For example, the EAX register is set to c0000080h (which looks like an error code). The content of the EDX register does not matter, and the content of the ECX register can be any value with bit 11 cleared (e.g. &00000800h==0) which is the NX control bit sometimes called the no-execute bit.

Although one specific example of malicious disabling of the no-execute processor feature is set forth, in light of this disclosure, one of skill in the art will understand that the no-execute processor feature can be maliciously disabled using any one of a number of techniques.

Host computer system 102 is coupled to a server system 130 of client-server system 100 by a network 124. Server system 130 typically includes a display device 132, a processor 134, a memory 136, and a network interface 138.

Further, host computer system 102 is also coupled to a hacker computer system 104 of client-server system 100 by network 124. In one embodiment, hacker computer system 104 is similar to host computer system 102, for example, includes a central processing unit, an input output (I/O) interface, and a memory. Hacker computer system 104 may further include standard devices like a keyboard, a mouse, a printer, a display device and an I/O device(s). The various hardware components of hacker computer system 104 are not illustrated to avoid detracting from the principles of the invention. Illustratively, malicious code is propagated from hacker computer system 104 to host computer system 102.

Network 124 can be any network or network system that is of interest to a user. In various embodiments, network interface 138 and I/O interface 110 include analog modems, digital modems, or a network interface card.

No-execute processor feature global disabling prevention application 106 is stored in memory 114 of host computer system 102 and executed on host computer system 102. The particular type of and configuration of host computer system 102, hacker computer system 104, and server system 130 are not essential to this embodiment of the present invention.

FIG. 2 is a flow diagram of a no-execute processor feature global disabling prevention process 200 in accordance with one embodiment of the present invention. Referring now to FIGS. 1 and 2 together, execution of no-execute processor feature global disabling prevention application 106 by processor 108 results in the operations of no-execute processor feature global disabling prevention process 200 as described below in one embodiment.

From an ENTER OPERATION 202, flow moves to a HOOK MODEL SPECIFIC REGISTER WRITE FUNCTION(S) OPERATION 204. In HOOK MODEL SPECIFIC REGISTER WRITE FUNCTION(S) OPERATION 204, model specific register write function(s) of host computer system 102 are hooked. As discussed above, a model specific register write function is a function used to write to a model specific register of processor 108.

Generally, at least one model specific register write function of host computer system 102 is hooked in HOOK MODEL SPECIFIC REGISTER WRITE FUNCTION(S) OPERATION 204. In one embodiment, an instruction, e.g., a jump instruction, is inserted directly into the model specific register write function to hook the model specific register write function in HOOK MODEL SPECIFIC REGISTER WRITE FUNCTION(S) OPERATION 204. When the model specific register write function is invoked, this jump instruction transfers control to no-execute processor feature global disabling prevention application 106, e.g., a module thereof. In this manner, irrespective of the manner in which the model specific register write function is invoked, control is transferred to no-execute processor feature global disabling prevention application 106.

In one specific embodiment, model specific register write functions, sometimes called sequences or CPU instructions, that are exploitable are found and replaced with a jump instruction. For example, a sequence of bytes such as:

wrmsr retn 0ch which translates to: 0f 30 C2 0C 00 bytes sequence are found and replaced.

In another embodiment, a model specific register write function is hooked by routing model specific register write function calls to no-execute processor feature global disabling prevention application 106, e.g., a hook module thereof, in accordance with one embodiment. For example, the system service table or a library is hooked to redirect model specific register write function calls to no-execute processor feature global disabling prevention application 106, e.g., a hook module thereof.

Although various examples of hooking a model specific register write function are described above, in light of this disclosure, those of skill in the art will understand that other techniques can be used to hook model specific register write functions. The particular technique used depends, for example, on the particular operating system.

From HOOK MODEL SPECIFIC REGISTER WRITE FUNCTION(S) OPERATION 204, flow moves to a NO-EXECUTE PROCESSOR FEATURE ENABLED CHECK OPERATION 206. In NO-EXECUTE PROCESSOR FEATURE ENABLED CHECK OPERATION 206, a determination is made as to whether the no-execute processor feature of processor 108 is enabled. If a determination is made that the no-execute processor feature of processor 108 is disabled, i.e., not enabled, or that processor 108 does not support the no-execute processor feature, flow moves from NO-EXECUTE PROCESSOR FEATURE ENABLED CHECK OPERATION 206 to an EXIT OPERATION 208 and exits. Conversely, if a determination is made that the no-execute processor feature of processor 108 is enabled, flow moves from NO-EXECUTE PROCESSOR FEATURE ENABLED CHECK OPERATION 206 to a MODEL SPECIFIC REGISTER WRITE FUNCTION INVOKED OPERATION 210.

In one embodiment, no-execute bit 144 in no-execute field 142 in no-execute model specific register 140 is read in NO-EXECUTE PROCESSOR FEATURE ENABLED CHECK OPERATION 206. If no-execute bit 144 indicates that the no-execute processor feature is enabled, e.g., no-execute bit 144 equals 1, then a determination is made that the no-execute processor feature of processor 108 is enabled in NO-EXECUTE PROCESSOR FEATURE ENABLED CHECK OPERATION 206. Conversely, if no-execute bit 144 indicates that the no-execute processor feature is disabled, e.g., no-execute bit 144 equals 0, then a determination is made that the no-execute processor feature of processor 108 is not enabled in NO-EXECUTE PROCESSOR FEATURE ENABLED CHECK OPERATION 206.

Accordingly, if the no-execute processor feature of processor 108 is disabled, flow exits at EXIT OPERATION 208 and no further action is taken. In this manner, use of resources of host computer system 102 by process 200 when the no-execute processor feature is disabled is avoided.

In accordance with one embodiment, NO-EXECUTE PROCESSOR FEATURE ENABLED CHECK OPERATION 206 is performed prior to HOOK MODEL SPECIFIC REGISTER WRITE FUNCTION(S) OPERATION 204. In accordance with this embodiment, upon a determination that the no-execute processor feature of processor 108 is disabled, flow moves directly to EXIT OPERATION 208 and exits. In this manner, performance of HOOK MODEL SPECIFIC REGISTER WRITE FUNCTION(S) OPERATION 204 is avoided when the no-execute processor feature of processor 108 is disabled. State another way, HOOK MODEL SPECIFIC REGISTER WRITE FUNCTION(S) OPERATION 204 is performed only when the no-execute processor feature of processor 108 is enabled.

However, returning to the embodiment illustrated in FIG. 2, upon a determination that the no-execute processor feature is enabled, flow moves from NO-EXECUTE PROCESSOR FEATURE ENABLED CHECK OPERATION 206 to MODEL SPECIFIC REGISTER WRITE FUNCTION INVOKED OPERATION 210. In MODEL SPECIFIC REGISTER WRITE FUNCTION INVOKED OPERATION 210, a model specific register write function hooked in HOOK MODEL SPECIFIC REGISTER WRITE FUNCTION(S) OPERATION 204 is invoked, i.e., activated.

Invocation (activation) of the model specific register write function is either malicious or non malicious. More particularly, in the event that the invocation of the model specific register write function is malicious, the model specific register write function has been invoked as a result of execution of malicious code. Conversely, in the event that the invocation of the model specific register write function is non-malicious, the model specific register write function has been invoked as a result of normal execution of code.

From MODEL SPECIFIC REGISTER WRITE FUNCTION INVOKED OPERATION 210, flow moves to a STALL EXECUTION OF MODEL SPECIFIC REGISTER WRITE FUNCTION OPERATION 212. In STALL EXECUTION OF MODEL SPECIFIC REGISTER WRITE FUNCTION OPERATION 212, execution of the model specific register write function is stalled. As discussed above, upon invocation of the model specific register write function, control is transferred to no-execute processor feature global disabling prevention application 106, e.g., a module thereof, which stalls execution of the model specific register write function.

From STALL EXECUTION OF MODEL SPECIFIC REGISTER WRITE FUNCTION OPERATION 212, flow moves to a NO-EXECUTE MODEL SPECIFIC REGISTER BEING OVERWRITTEN CHECK OPERATION 214. In NO-EXECUTE MODEL SPECIFIC REGISTER BEING OVERWRITTEN CHECK OPERATION 214, a determination is made as to whether no-execute model specific register 140 is being overwritten.

In accordance with one embodiment, the parameter associated with the model specific register write function that specifies which model specific register is being written to is read. If the parameter indicates that the model specific register that is being written to is no-execute model specific register 140, a determination is made that no-execute model specific register 140 is being overwritten. Conversely, if the parameter indicates that the model specific register that is being written to is other than no-execute model specific register 140, a determination is made that no-execute model specific register 140 is not being overwritten.

In one embodiment, the MSR value in the EAX register is read. This MSR value, sometimes called index, is the parameter associated with the model specific register write function that specifies which model specific register is being written to. If the MSR value specifies no-execute model specific register 140, then the model specific register that is being written to is no-execute model specific register 140. For example, if the MSR value in the EAX register is c0000080h, then no-execute model specific register 140 is being overwritten.

If a determination is made that no-execute model specific register 140 is not being overwritten, flow moves from NO-EXECUTE MODEL SPECIFIC REGISTER BEING OVERWRITTEN CHECK OPERATION 214 to an ALLOW EXECUTION OF MODEL SPECIFIC REGISTER WRITE FUNCTION OPERATION 216. In ALLOW EXECUTION OF MODEL SPECIFIC REGISTER WRITE FUNCTION OPERATION 216, execution of the model specific register write function is allowed. For example, control is transferred back to the model specific register write function. Recall that execution of the model specific register write function was stalled in STALL EXECUTION OF MODEL SPECIFIC REGISTER WRITE FUNCTION OPERATION 212.

Execution of the model specific register write function overwrites the register value within a model specific register other than no-execute model specific register 140. Because no-execute model specific register 140 is not being overwritten, invocation of the model specific register write function is not associated with malicious code attempting to defeat the no-execute processor feature of processor 108. More likely, invocation of the model specific register write function is as a result of normal execution of code.

From ALLOW EXECUTION OF MODEL SPECIFIC REGISTER WRITE FUNCTION OPERATION 216, flow moves to and exits at EXIT OPERATION 208 or returns to MODEL SPECIFIC REGISTER WRITE FUNCTION INVOKED OPERATION 210 upon the next invocation of a model specific register write function.

However, returning again to NO-EXECUTE MODEL SPECIFIC REGISTER BEING OVERWRITTEN CHECK OPERATION 214, if a determination is made that no-execute model specific register 140 is being overwritten, flow moves from NO-EXECUTE MODEL SPECIFIC REGISTER BEING OVERWRITTEN CHECK OPERATION 214 to a NO-EXECUTE FIELD BEING ALTERED CHECK OPERATION 218. In NO-EXECUTE FIELD BEING ALTERED CHECK OPERATION 218, a determination is made as to whether no-execute field 142 in no-execute model specific register 140 is being altered. More particularly, in NO-EXECUTE FIELD BEING ALTERED CHECK OPERATION 218, a determination is made as to whether no-execute bit 144 in no-execute field 142 is being changed, e.g., from a one (1) to a zero (0).

In accordance with one embodiment, the parameter associated with the model specific register write function that specifies the register value to be written to the model specific register is read. If the specific bit to be written to no-execute field 142 of the register value is different than the current no-execute value (no-execute bit 144) in no-execute field 142, a determination is made that no-execute field 142 is being altered. For example, if the specific bit to be written to no-execute field 142 is a zero and the current no-execute value (no-execute bit 144) in no-execute field 142 is a one, a determination is made that no-execute field 142 is being altered.

Conversely, if the specific bit to be written to no-execute field 142 of the register value is the same as the current no-execute value (no-execute bit 144) in no-execute field 142, a determination is made that no-execute field 142 is not being altered. For example, if the specific bit to be written to no-execute field 142 is a one and the current no-execute value (no-execute bit 144) in no-execute field 142 is a one, a determination is made that no-execute field 142 is not being altered.

In one embodiment, the value in the ECX register is read. This value is the parameter associated with the model specific register write function that specifies the register value to be written to the model specific register. If the specific bit, e.g., bit 11, to be written to no-execute field 142 of the value in the ECX register is different than the current no-execute value (no-execute bit 144) in no-execute field 142, a determination is made that no-execute field 142 is being altered. For example, if the value in the ECX register is &00000800h=0, no-execute field 142 is being altered.

In another embodiment, in NO-EXECUTE FIELD BEING ALTERED CHECK OPERATION 218, a determination is made as to whether the current no-execute value (no-execute bit 144) in no-execute field 142 is being overwritten. If no-execute field 142 is being overwritten, then a determination is made that no-execute field 142 is being altered. A determination is made that no-execute field 142 is being altered even if the new value being written to no-execute field 142 is that same as the current no-execute value (no-execute bit 144) in no-execute field 142.

If a determination is made that no-execute field 142 is not being altered, flow moves from NO-EXECUTE FIELD BEING ALTERED CHECK OPERATION 218 to ALLOW EXECUTION OF MODEL SPECIFIC REGISTER WRITE FUNCTION OPERATION 216, which is performed as discussed above.

Because no-execute field 142 is not being altered, invocation of the model specific register write function is not associated with malicious code attempting to defeat the no-execute processor feature of processor 108. More likely, invocation of the model specific register write function is as a result of normal execution of code.

From ALLOW EXECUTION OF MODEL SPECIFIC REGISTER WRITE FUNCTION OPERATION 216, flow moves to and exits at EXIT OPERATION 208 or returns to MODEL SPECIFIC REGISTER WRITE FUNCTION INVOKED OPERATION 210 upon the next invocation of a model specific register write function.

However, returning again to NO-EXECUTE FIELD BEING ALTERED CHECK OPERATION 218, if a determination is made that no-execute field 142 is being altered, flow moves, optionally, to a KNOWN FALSE POSITIVE CHECK OPERATION 220 (or directly to a TAKE PROTECTIVE ACTION OPERATION 222 if KNOWN FALSE POSITIVE CHECK OPERATION 220 is not performed).

In KNOWN FALSE POSITIVE CHECK OPERATION 220, a determination is made as to whether the alteration of no-execute field 142 is a known false positive. A known false positive occurs when no-execute field 142 is altered but the alteration is, in fact, safe, i.e., is not associated with malicious code. If a determination is made in KNOWN FALSE POSITIVE CHECK OPERATION 220 that the alteration of no-execute field 142 is a known false positive, flow moves to ALLOW EXECUTION OF MODEL SPECIFIC REGISTER WRITE FUNCTION OPERATION 216, which is performed as discussed above. Conversely, if a determination is made in KNOWN FALSE POSITIVE CHECK OPERATION 220 that the alteration of no-execute field 142 is not a known false positive, flow moves to TAKE PROTECTIVE ACTION OPERATION 222.

In TAKE PROTECTIVE ACTION OPERATION 222, protective action is taken to prevent the malicious code from causing damage to or exploiting host computer system 102, i.e., to protect host computer system 102. Illustratively, execution of the model specific register write function is prevented thus preventing alteration of no-execute field 142 and the disabling of the no-execute processor feature of processor 108. In another example, host computer system 102 is frozen, e.g., sometimes called blue screened, and a log identifying the application that attempted to alter no-execute field 142 is generated.

From TAKE PROTECTIVE ACTION OPERATION 222, flow moves to and exits at EXIT OPERATION 208 or returns to MODEL SPECIFIC REGISTER WRITE FUNCTION INVOKED OPERATION 210 upon the next invocation of a model specific register write function.

Thus, when no-execute field 142 is being altered, invocation of the model specific register write function is highly likely, if not certainly, associated with malicious code attempting to defeat the no-execute processor feature of processor 108. Accordingly, protective action is taken in TAKE PROTECTIVE ACTION OPERATION 222 to prevent disabling of the no-execute processor feature.

Referring again to FIG. 1, no-execute processor feature global disabling prevention application 106 is in computer memory 114. As used herein, a computer memory refers to a volatile memory, a non-volatile memory, or a combination of the two.

Although no-execute processor feature global disabling prevention application 106 is referred to as an application, this is illustrative only. No-execute processor feature global disabling prevention application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client-server configuration, an embodiment of the present invention may be carried out using any suitable hardware configuration and/or means involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, and servers on a network.

As illustrated in FIG. 1, this medium may belong to the computer system itself. However, the medium also may be removed from the computer system. For example, no-execute processor feature global disabling prevention application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the no-execute processor feature global disabling prevention functionality in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the no-execute processor feature global disabling prevention functionality in accordance with one embodiment of the present invention can be implemented in a wide variety of computer system configurations. In addition, the no-execute processor feature global disabling prevention functionality could be stored as different modules in memories of different devices. For example, no-execute processor feature global disabling prevention application 106 could initially be stored in server system 130, and then as necessary, a portion of no-execute processor feature global disabling prevention application 106 could be transferred to host computer system 102 and executed on host computer system 102. Consequently, part of the no-execute processor feature global disabling prevention functionality would be executed on processor 134 of server system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, no-execute processor feature global disabling prevention application 106 is stored in memory 136 of server system 130. No-execute processor feature global disabling prevention application 106 is transferred over network 124 to memory 114 in host computer system 102. In this embodiment, network interface 138 and I/O interface 110 would include analog modems, digital modems, or a network interface card. If modems are used, network 124 includes a communications network, and no-execute processor feature global disabling prevention application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
    stalling execution of a model specific register write function to write to a model specific register of a processor having a no-execute processor feature enabled;
    determining that said model specific register is a no-execute model specific register of said processor;
    determining whether a no-execute field in said no-execute model specific register is being altered; and
    taking protective action to protect a computer system comprising said processor upon a determination that said no-execute field is being altered.

2. The method of claim 1 wherein said taking protective action comprising preventing execution of said model specific register write function.

3. The method of claim 1 wherein said taking protective action comprises preventing said no-execute field from being altered.

4. The method of claim 1 wherein said taking protective action comprises preventing said no-execute processor feature from being disabled.

5. The method of claim 1 wherein said taking protective action comprises generating a log identifying an application that attempted to alter said no-execute field.

6. The method of claim 1 wherein said taking protective action comprises freezing said computer system.

7. The method of claim 1 wherein prior to said taking protective action, said method further comprises determining that said alteration of said no-execute field is not a known false positive.

8. The method of claim 1 further comprising allowing said execution of said model specific register write function upon a determination that said no-execute field is not being altered.

9. The method of claim 8 wherein said execution of said model specific register write function overwrites a register value within a model specific register other than said no-execute model specific register.

10. The method of claim 1 further comprising hooking said model specific register write function.

11. The method of claim 10 wherein said hooking comprises inserting a jump instruction into said model specific register write function.

12. The method of claim 1 further comprising determining that said no-execute processor feature is enabled.

13. The method of claim 12 wherein said determining that said no-execute processor feature is enabled comprises determining that a no-execute bit in said no-execute field indicates that said no-execute processor feature is enabled.

14. The method of claim 1 wherein said no-execute processor feature prevents execution of code from a page of memory marked as non-executable.

15. A method comprising:
    determining whether a no-execute processor feature of a processor is enabled;
    upon a determination that said no-execute processor feature is enabled, stalling execution of a model specific register write function to write to a model specific register of said processor;
    determining whether said model specific register is a no-execute model specific register of said processor;
    upon a determination that said model specific register is said no-execute model specific register, determining whether a no-execute field in said no-execute model specific register is being altered; and
    upon a determination that said no-execute field is being altered, taking protective action to protect a computer system comprising said processor.

16. The method of claim 15 wherein upon a determination that said no-execute processor feature is not enabled, said method further comprising taking no further action.

17. The method of claim 15 wherein upon a determination that said model specific register is not said no-execute model specific register, said method further comprising allowing said execution of said model specific register write function.

18. The method of claim 15 wherein upon a determination that said no-execute field in said no-execute model specific register is not being altered, said method further comprising allowing said execution of said model specific register write function.

19. A system comprising:
    a means for stalling execution of a model specific register write function to write to a model specific register of a processor having a no-execute processor feature enabled;
    a means for determining that said model specific register is a no-execute model specific register of said processor; and
    a means for determining whether a no-execute field in said no-execute model specific register is being altered.

20. A computer-program product comprising a computer readable storage medium containing computer program code comprising:
    a no-execute processor feature global disabling prevention application for stalling execution of a model specific register write function to write to a model specific register of a processor having a no-execute processor feature enabled;
    said no-execute processor feature global disabling prevention application further for determining that said model specific register is a no-execute model specific register of said processor;
    said no-execute processor feature global disabling prevention application further for determining whether a no-execute field in said no-execute model specific register is being altered;
    said no-execute processor feature global disabling prevention application further for taking protective action to protect a computer system comprising said processor upon a determination that said no-execute field is being altered.

21. A computer system comprising:
    a memory having stored therein a no-execute processor feature global disabling prevention application; and
    a processor coupled to said memory, wherein execution of said no-execute processor feature global disabling prevention application generates a method comprising:
    stalling execution of a model specific register write function to write to a model specific register of a processor having a no-execute processor feature enabled;
    determining that said model specific register is a no-execute model specific register of said processor; and
    determining whether a no-execute field in said no-execute model specific register is being altered.

* * * * *